Aug. 13, 1968     R. P. WOLGAST     3,397,322
PORTABLE RESISTANCE SPOT WELDER
Filed Jan. 25, 1965     2 Sheets-Sheet 1
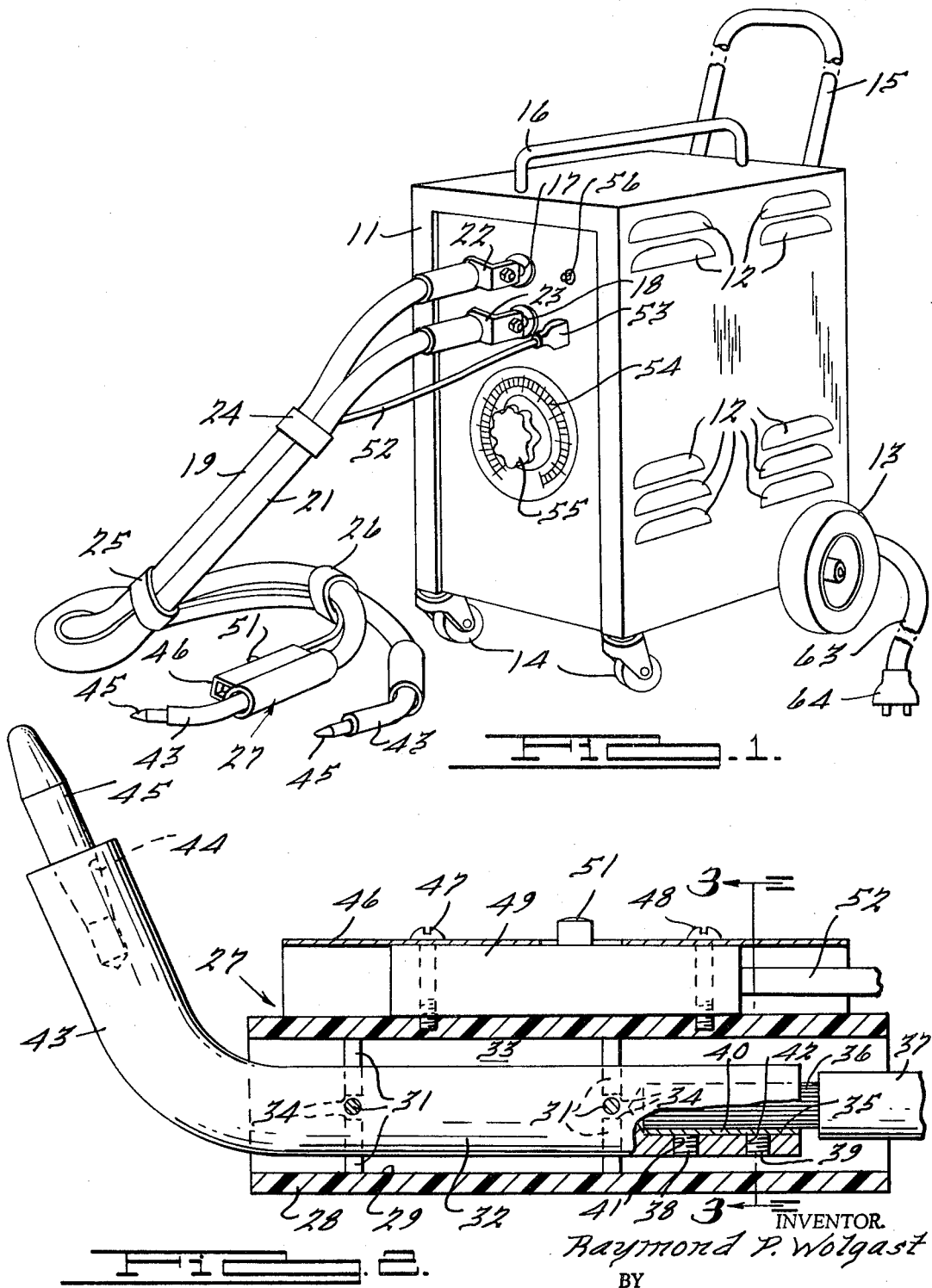
INVENTOR.
Raymond P. Wolgast
BY
Harness, Dickey & Pierce
ATTORNEYS.

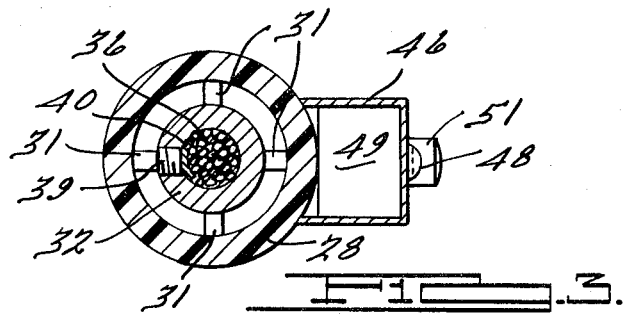
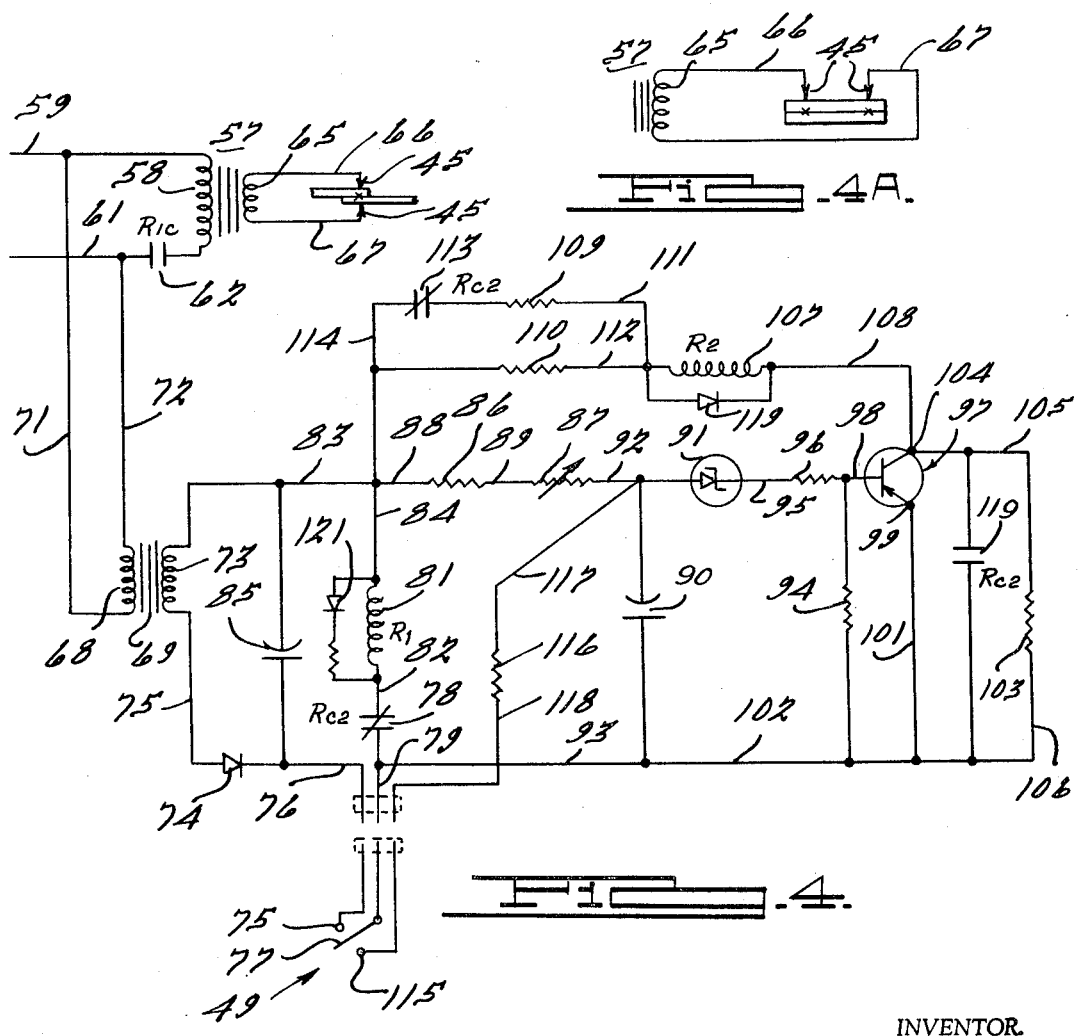

United States Patent Office 3,397,322
Patented Aug. 13, 1968

3,397,322
PORTABLE RESISTANCE SPOT WELDER
Raymond P. Wolgast, 3726 Kipling Road,
Berkley, Mich. 48072
Filed Jan. 25, 1965, Ser. No. 427,679
8 Claims. (Cl. 307—141)

This invention relates to a portable resistance spot welding machine and more particularly to an improved electrode holder and control circuit for such a machine.

It has been proposed to provide a portable spot welding machine in which the welding transformer and control mechanism is contained within a portable housing that may be moved from position to position. This type of mechanism has application in uses where production line facilities employing large equipment are not practical. A portable welding apparatus has particular application in automotive body shops and metal working shops where-in spot welding is a desirable fabricating technique, but previous equipment has not been sufficiently flexible to permit its use for all spot welding applications.

It, therefore, is a principal object of this invention to provide an improved portable resistance spot welding machine that is sufficiently flexible to make all types of spot welds.

In the most conventional type of spot welding apparatus, a pair of electrodes are brought into engagement with opposite surfaces of the members to be welded. Because of the pressure exerted upon the members through the electrodes, this method of spot welding is called a "pinch gun" technique. Pinch gun spot welding is most commonly associated with production line welding machines wherein a great number of identical welds are made by a single machine. There are many instances, however, where the pinch type welding technique cannot be employed.

Automotive body repair shops and small sheet metal shops are typical examples of applications wherein the pinch type welding apparatus may not be practical. These shops normally are not called upon to make a great number of identical welds. The physical location of the area to be welded also dictates against the use of the pinch weld technique. Although in some instances the locations of the weld will permit the pinch technique, another method of spot welding called the indirect method frequently must be used. The indirect welding method has particular application where the parts to be welded are so positioned as to make it impossible or impractical for opposite sides to be engaged by the electrodes. In the indirect welding method, the electrodes are both positioned on the same side of the parts to be welded but have spaced locations.

The welding time required to complete the indirect type of spot weld is considerably greater than the time required to make a direct, pinch type weld. If the indirect weld is to be made with a portable machine, effective heat insulation must be provided between the electrodes and the operator's hands. The required insulation has been accomplished heretofore by the use of cumbersome, heavy electrode holders formed from an insulating material. If a heavy electrode holder is employed, the operator soon becomes fatigued, particularly when lengthy indirect welds are being made.

It is a further object of this invention to provide an improved, insulated electrode holder for a portable resistance spot welding machine.

It is well known that line voltage varies considerably due to several factors. For example, the public utilities' ability to regulate the supply voltage within the power demands imposed on the distribution system normally can result in no better than a plus or minus 10% variation in supply voltage. The voltage within a given shop also will vary depending upon the load within the shop. The load of the spot welder itself, for example, may cause a momentary 15% voltage drop in a small shop. Since the portable type welder is intended for use in these shops, it must be able to operate over widely varying voltages. The control circuits provided to satisfy these operating requirements that, heretofore, have been proposed, have added considerable cost to the welding apparatus.

It is a still further object of this invention to provide an improved control circuit for a portable resistance spot welding machine.

A portable resistance spot welding machine embodying this invention comprises a lightweight cabinet which contains the welding transformer and the control mechanism for the welding transformer. A pair of electrical cables extend from the cabinet and are supported by it. One end of each of the cables is connected to the secondary winding of the welding transformer. The other end of each of the cables is electrically connected to one end of an electrode that carries a welding tip at its other end. The one end of the electrode extends into a cavity that is formed in an electrode holder. The contained portion of the electrode and the adjacent surface of the holder that defines the cavity are spaced a sufficient distance to form an insulating air gap therebetween. The cavity preferably is open at each end to the atmosphere so that a cooling air flow through the cavity may be set up by convection.

The control circuit for the welding transformer includes a first switch for controlling current flow through the primary winding of the welding transformer. A control transformer is provided that has a primary winding in circuit with the primary winding of the welding transformer. A first relay coil that controls the first switch is connected in circuit with the secondary winding of the control transformer by a first circuit means. The first circuit means includes a control switch and a second switch each of which control current flow through the first relay coil. Second circuit means are provided in circuit with the secondary winding of the control transformer and parallel to the first relay coil. The second circuit means includes a transistor and a time responsive device for switching the transistor. A second relay coil is in circuit with the transistor for experiencing current flow when the transistor is switched. The second switch is opened upon current flow through the second relay coil to interrupt the current flow through the first relay coil and open the first switch.

Other objects, features, and advantages of the present invention will become apparent from the subsequent description and the appended claims, particularly when taken in conjunction with the accompanying drawings, in which;

FIGURE 1 is a perspective view of a portable resistance spot welding machine embodying this invention.

FIGURE 2 is a cross-sectional view taken substantially through the longitudinal center of one of the electrode holders shown in FIGURE 1.

FIGURE 3 is a cross-sectional view taken across the line 3—3 of FIGURE 2.

FIGURE 4 is an electrical diagram of the control circuit of the spot welding machine shown in FIGURE 1.

FIGURE 4–a is a circuit diagram of the secondary side of the welding transformer shown in FIGURE 4 with the electrodes positioned for indirect spot welding.

Referring now in detail to the drawings, FIGURE 1 illustrates a portable resistance spot welding machine comprising a sheet metal cabinet 11 that contains a welding transformer and its control apparatus. The sides of the cabinet 11 may be provided with louvers 12 so that heat generated within the cabinet 11 may be dissipated to the atmosphere. The rear portion of the cabinet 11 is supported upon wheels 13 (only one of which is shown) and the forward portion is supported upon casters 14 so that the cabinet 11 may be readily moved from place to place. A handle assembly 15 is affixed to the cabinet 11 to facilitate its movement. A lifting lug 16 is affixed to the upper surface of cabinet 11 so that the cabinet 11 may be lifted if desired.

Contained within the cabinet 11 is a welding transformer that has output terminals 17 and 18 extending through the front surface of the cabinet 11. A pair of electrical cables 19 and 21 are affixed to the transformer output terminals 17 and 18 by the connectors 22 and 23, respectively. The cables 19 and 21 are fixed relative to each other at spaced portions along their length by rubber clamps 24, 25, 26. The clamp 26 is spaced from the electrode ends of the cables 19 and 21 so that the electrodes carried thereby may be adequately manipulated to permit either direct or indirect spot welds to be made.

Referring now to FIGURES 2 and 3, an electrode support assembly, indicated generally by the reference numeral 27, is shown in cross section. A substantially similar support assembly may be positioned at the electrode ends of each of the cables 19 and 21 although in this instance slightly different support assemblies are used. The support assembly 27 is provided at the electrode end of the cable 19 and a somewhat similar support assembly is provided at the electrode end of the cable 21.

The electrode support assembly 27 is comprised of a tubular electrode holder 28 that may be formed from vulcanized fibre tube or some other material having relatively low coefficients of thermal and electrical conductivity. The holder 28 is formed with a cylindrical cavity 29 that extends completely through the holder 28 from one end to the other. A number of symmetrically spaced spaces or projections 31, extend radially from a cylindrical electrode portion 32 to the wall of the cavity 29. Preferably, at least two sets of these projections are provided along the longitudinal axis of the cavity 29. The projections 31 may be formed integrally with the holder 28 or may consist of separate members press fit in holes drilled in the electrode portion 32. It is desirable to form them from a ceramic or synthetic material or some material having a lower coefficient of thermal conductivity than the electrode portion 32.

The copper electrode portion 32 lies entirely in the cavity 29 and is of a diameter significantly less than the diameter of the electrode holder cavity 29 so that an annular air gap 33 is formed around the electrode portion 32. The electrode portion 32 is centered within the cavity 29 by the projections 31 to provide a uniform air gap around its circumference. The projections 31 have radially outer termini which lie on a common cylinder of a size enabling the electrode holder 28 to be slid over said termini and positioned thereon with a force fit. The electrode holder 28 is thus fixed both radially and axially on the electrode portion 32 by frictional engagement with the projection ends 34.

The inner end of the electrode portion 32 has a longitudinally extending bore 35 formed therein. The bore 35 receives the strands 36 of the electrode end of the cable 19 from which the electrical insulation 37 has been removed. The strands 36 are clamped in the bore 35 by a pressure plate 40 that is held tight by set screws 38 and 39 threaded through tapped holes 41 and 42 formed in the electrode portion 32. It should be readily apparent that the cables 19 and 21 are secured to each of the electrode portions 32 by first threading the electrode ends of the cables completely through the cylindrical cavity 29. Once the cables 19 and 21 are affixed to the electrodes, the electrodes may be forced axially into the electrode holders 28.

The outer ends of the electrodes are formed with a curved portion 43. The curved portion 43 terminates at a tapered hole 44 into which a tapered solid copper alloy welding tip 45 may be inserted. When the welding tips 45 are brought into engagement with the sheet metal surfaces to be welded they will complete an electrical circuit in the secondary side of the welding transformer in a manner which will become more apparent as this description proceeds. If a direct, pinch type spot weld is being made, the welding tips 45 will be brought into aligned engagement with the opposite surfaces that are to be welded as shown schematically in FIGURE 4. If an indirect type of weld is being made, the welding tips 45 will be positioned on the same side of one of the surfaces to be welded at spaced locations as shown in FIGURE 4–a. Regardless of the type weld being made, the electrodes will become heated during the welding operation. The heat conducted to the electrode portion 32 will be dissipated by conduction and convection to the surrounding air gap 33. Convection along the axis of the cavity 29 will cause the heated air to flow through air gap 33 to provide continuous cooling. It should be readily apparent, therefore, that effective heat insulation is provided by the air space between the electrode and the electrode holder without necessitating the provision of any additional insulating material.

As has been previously noted, the support assembly 27 that is at the electrode end of the cable 19, differs slightly from the support assembly provided at the electrode end of the cable 21. The support assembly 27 includes a channel shaped sheet metal member 46 that is affixed to the electrode housing 28 by a pair of bolts 47 and 48. The member 46 and bolts 47 and 48 also support a control switch 49 having a button 51. The control switch 49 is electrically connected to the control circuit of the welding machine that is contained within the cabinet 11 by means of an electrical cable 52 and a connector 53. The switch 49 is, in effect, an on-off single pole double throw switch and controls the initiation of the weld, as will become more apparent as this description proceeds.

The duration of the weld is controlled by a variable potentiometer having a dial 54 carried by the front of the cabinet 11. A control knob 55 is provided to set the variable potentiometer. An indicator light 56 at the upper front of the cabinet 11 indicates when the welding machine is on the power line.

Referring now to FIGURE 4, a welding transformer 57 has a primary winding 58 that is connected to line voltage by a conductor 59 and a conductor 61 in which a normally open pair of switch contacts 62 is provided. The conductors 59 and 61 are contained within an electrical cord 63 which terminates at a plug 64 (FIGURE 1) for connection to line voltage. The secondary winding 65 of the welding transformer 57 is connected to the electrodes by the cables 19 and 21, identified schematically as the conductors 66 and 67, respectively, in FIGURE 4.

A primary winding 68 of a control transformer 69 is connected in parallel circuit with the welding transformer primary winding 58 by the conductors 71 and 72. The control transformer 69 is a step-down transformer so that the operation of the welding transformer 57 may be controlled at a lower voltage than line voltage, which is preferably 230 volts. A secondary winding 73 of the control transformer 69 is connected at one end to a rectifier diode 74 by a conductor 75. The output side of the rectifier diode 74 is connected to a normally open terminal 75 of the switch 49 by a conductor 76.

A contact 77 of the switch 49 is connected to one contact of a normally closed switch 78 by a conductor 79. The other contact of the switch 78 is connected to one side of the relay coil 81 by a conductor 82. The other end of the relay coil 81 is connected to the other end of the control transformer secondary winding 73 by conductors 83 and 84. A filter capacitor 85 is wired across the relay coil 81 in parallel circuit with it.

One side of the relay coil 81 and control transformer secondary winding 73 are connected to a fixed resistor 86, and a variable potentiometer 87 by conductors 88 and 89. The variable potentiometer 87 is also in circuit with one side of a voltage reference diode 91 by means of a conductor 92. The opposite end of the relay coil 81 is connected to the opposite side of the voltage reference diode 91 when the switch 78 is closed by means of a conductor 93, a resistor 94 and a conductor 95 in which a resistor 96 is positioned. A capacitor 90 is positioned across the conductors 92 and 93 so that it will be charged in proportion to the current flow through the variable potentiometer 87.

The resistor 96 on the output side of the voltage reference diode 91 is also connected to the base of a transistor 97 by a conductor 98. A first terminal 99 of the transistor 97 is connected to the contact 77 of the switch 49 by conductors 101, 102 and the conductor 93. A resistor 103 is connected in parallel across the transistor contact 99 and its other contact 104 by conductors 105 and 106. A normally open switch 119 is also in parallel circuit with the resistor 103 and the terminals 99 and 104 of the transistor 97.

One end of a second relay coil 107 is connected in circuit with the transistor terminal 104, the resistor 103, and one contact of the switch 119 by a conductor 108. The other end of the second relay coil 107 is connected to a pair of parallel resistors 109 and 110 by conductors 111 and 112. A normally closed switch 113 is wired in series with the resistor 109. A conductor 114 completes the parallel connection between the resistors 109 and 110. The conductor 114 is also connected to one side of the secondary winding 73 of the control transformer 69 through the conductor 83.

The contacts of the switch 62 are actuated by the control relay 81 in any known manner. In a like manner, the contacts of the switches 78, 119, and 113 are all actuated simultaneously by the second relay coil 107. The second relay coil 107 is designed, however, so that the contacts which are associated with it will not be actuated until the voltage upon the relay coil 107 exceeds a predetermined voltage.

The switch 49 is closed by moving the contact 77 of the switch 49 into engagement within its terminal 75. Current will flow through the control transformer 69 and the first relay coil 81. The current flow to the first relay coil 81 causes the contacts of switch 62 to close and transmit current to the primary winding of the welding transformer 57. If the electrodes are both in contact with conductive parts to be welded, welding will commence. A charge will build upon the capacitor 90 at a rate that depends upon the setting of the variable potentiometer 87. When the voltage upon capacitor 90 reaches the breakdown voltage of the voltage reference diode 91, it will conduct current to the transistor base 98 which causes the transistor 97 to act as a switch so that current may be conducted across its collector-emitter terminals 99 and 104. Although previously current had been flowing through the second relay coil 107, the voltage upon the coil 107 was insufficient to cause actuation of its contacts because of the resistor 103. When the transistor 97 conducts, however, the voltage upon the second relay coil 107 will be sufficient to cause it to actuate its contacts. When the contact 78 is opened, there will no longer be a potential upon the first relay coil 81 and the contact 62 will open to stop the flow of current through the welding transformer. Welding will then cease.

In addition to the action of the contact 78, the coil 107 also will close the switch 119 to shunt the transistor 98 and decrease thermal loads upon it. The normally closed contact 113 is also opened to remove the resistor 109 from the parallel resistor circuit that is in series with the coil 107. This will, in effect, increase the resistance in the circuit in which the second relay coil 107 is located to protect the coil 107 from excessive voltage which otherwise would be imposed upon it when the contacts 62 open and the welding load is removed from the line.

When the switch 49 is released, the contact 77 engages a terminal 115 of the switch 49. A resistor 116 is placed across the capacitor 90 by the connectors 117, 118 and 93. The resistor 116 will discharge the capacitor 90 after the welding operation so that it will be ready for the next welding cycle.

Diodes 119 and 121 may be positioned across the relay coils 107 and 81, respectively, to reduce inductive voltage transients. It should be readily apparent that, because the resistor 103 is wired in parallel across the transistor contacts 99 and 104, it will reduce the collector to emitter potential upon the transistor 97 and permit the use of a lower cost transistor. In addition, the voltage at which the relay coil 107 actuates is selected so that the coil will actuate over the wide range of variances in line voltage that are experienced in small shops.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a charging capacitor and a variable potentiometer for regulating the time rate of voltage build up on said charging capacitor, a transistor, and a voltage responsive device for switching said transistor, said charging capacitor establishing the voltage potential at which the voltage responsive device will operate, a resistor in parallel circuit with the collector emitter circuit of said transistor for limiting the potential upon said transistor, third circuit means in circuit with said transistor for experiencing current flow when said transistor is switched, a second relay coil in said third circuit means, a pair of resistors in parallel circuit with each other and in series circuit with said second relay coil, a third switch in series with one resistor of said pair of resistors, means for opening said second and said third switches upon a predetermined current flow through said second relay coil for interrupting the current flow through said first relay coil to open said first switch, and means for discharging said capacitor upon the cessation of current flow through said first relay coil.

2. A control circuit for a welding transformer having a primary winding in circuit with a source of line voltage, a first switch for controlling current flow through said primary winding of said welding transformer, a control transformer having a primary winding in parallel circuit with said primary winding of said control transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a charging capacitor and a variable potentiometer, for regulating the time rate of voltage build up on said charging capacitor, a transistor and a voltage responsive device for switching said transistor, said charging capacitor establishing the voltage potential at which the voltage responsive device will operate, third circuit means in circuit with said transistor for experiencing current flow when said transistor is switched, a second relay coil in said third circuit means, a pair of resistors in parallel circuit with each other and in series circuit with said second relay coil, a third switch in series with one of said resistors, means for opening said second and said third switches upon a predetermined current flow through said second relay coil for interrupting the current flow through said first relay coil to open said first switch, and means for discharging said capacitor upon the cessation of current flow through said first relay coil.

3. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a transistor and time responsive means for switching said transistor, third circuit means in circuit with a transistor for experiencing current flow when said transistor is switched, a second relay coil in said third circuit means, a pair of resistors in parallel circuit with each other and in series circuit with said second relay coil, a third switch in series with one of said resistors, means for opening said second and third switches upon a predetermined current flow through said second relay coil for interrupting the current flow through said first relay coil to open said first switch, and means for discharging said capacitor upon the cessation of current flow through said first relay coil.

4. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a charging capacitor and a variable potentiometer for regulating the time rate of voltage build up on said charging capacitor, a transistor and a voltage responsive device for switching said transistor, said charging capacitor establishing the voltage potential at which the voltage responsive device will operate, third circuit means in circuit with said transistor for experiencing current flow when said transistor is switched, a second relay coil in said third circuit means, a pair of resistors in parallel circuit with each other and in series circuit with said second relay coil, a third switch in series with one of said resistors, and means for opening said second and said third switches upon a predetermined current flow through said second relay coil for interrupting the current flow through said first relay coil to open said first switch.

5. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a transistor and a time responsive device for switching said transistor, third circuit means in circuit with said transistor for experiencing current flow when said transistor is switched, a second relay coil in said third circuit means, a pair of resistors in parallel circuit with each other and in series circuit with said second relay coil, a third switch in series with one of said resistors, and means for opening said second and said third switches upon a predetermined current flow in said second relay coil for interrupting the current flow through said first relay coil to open said first switch.

6. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer parallel to said first relay coil, said second circuit means including a charging capacitor and a variable potentiometer for regulating the time rate of voltage build up on said charging capacitor, a transistor and a voltage responsive device for switching said transistor, a second relay coil in circuit with said transistor for experiencing current flow when said transistor is switched, a resistor in parallel with the collector emitter circuit of said transistor for limiting the potential upon said transistor, said charging capacitor establishing the voltage potential at which the voltage responsive device will operate, means for opening said second switch upon current flow through said second relay coil for interrupting the current flow through said first relay coil to open said first switch, and means for discharging said capacitor upon the cessation of current flow through said first relay coil.

7. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer parallel to said first relay coil, said second circuit means including a charging capacitor and a variable potentiometer for regulating the time rate of voltage build up on said charging capacitor, a transistor and a voltage responsive device for switching said transistor, a second relay coil in circuit with said transistor for experiencing current flow when said transistor is switched, said resistor in parallel with the collector emitter circuit for said transistor for limiting the potential upon said transistor, a charging capacitor establishing the voltage potential at which the voltage responsive device will operate, and means for opening said second switch upon a predetermined current flow through said second relay coil for interrupting the current flow through said first relay coil to open said first switch.

8. A control circuit for a welding transformer having a primary winding in circuit with a source of line voltage, a first switch for controlling current flow through said primary winding of said welding transformer, a control transformer having a primary winding in parallel circuit with said primary winding of said welding transformer, a first relay coil for actuating said first switch, first circuit means for connecting said first relay coil in circuit with the secondary winding of said control transformer, said first circuit means including a control switch and a second switch for controlling current flow through said first relay coil, second circuit means in circuit with said secondary winding of said control transformer in parallel to said first relay coil, said second circuit means including a transistor and a time responsive device for switching said transistor, a second relay coil in circuit with said transistor for experiencing current flow when said transistor is switched, a resistor in parallel circuit with the collector emitter circuit of said transistor for limiting the potential upon said transistor, and means for opening said second switch upon a predetermined current flow through said second relay coil for interrupting the current flow through said first relay coil to open said first switch.

References Cited

UNITED STATES PATENTS

| | | | |
|---|---|---|---|
| 1,649,391 | 11/1927 | Davis | 317—20 X |
| 1,939,064 | 12/1933 | Kopczynski | 317—20 X |
| 2,597,347 | 5/1952 | Lommen | 317—142 X |
| 2,925,548 | 2/1960 | Scherer. | |
| 2,963,596 | 12/1960 | Bross | 317—148.5 |
| 3,034,024 | 5/1962 | Mierendorf et al. | 317—148.5 |
| 3,071,712 | 1/1963 | Porter | 317—142 |
| 3,250,891 | 5/1966 | Pease | 317—142 X |
| 1,550,878 | 8/1925 | Charleston et al. | 219—233 |
| 2,079,857 | 5/1937 | Hulan | 219—86 |
| 2,309,886 | 2/1943 | Collins | 219—142 |
| 2,343,799 | 3/1944 | Radabaugh | 219—142 |
| 2,510,099 | 6/1950 | Gilliver | 219—78 |
| 2,776,399 | 1/1957 | Sommeria | 323—18 |
| 2,968,760 | 1/1961 | Cater | 323—58 |

FOREIGN PATENTS 801,594   9/1958   Great Britain.

ROBERT K. SCHAEFER, *Primary Examiner.*

T. B. JOIKE, *Assistant Examiner.*